United States Patent [19]
DeGood

[11] Patent Number: 4,832,184
[45] Date of Patent: May 23, 1989

[54] LIVE ROLLER CONVEYOR APPARATUS
[75] Inventor: Randall K. DeGood, Jenison, Mich.
[73] Assignee: Effective Flow Ideas, Inc., Jenison, Mich.
[21] Appl. No.: 28,554
[22] Filed: Mar. 20, 1987
[51] Int. Cl.⁴ ............................................ B65G 13/06
[52] U.S. Cl. ............................ 198/781; 198/789; 192/67 P
[58] Field of Search .................. 198/781, 789–791; 74/405; 192/67 P, 67 R; 474/84–89

[56] References Cited

U.S. PATENT DOCUMENTS

| | | | |
|---|---|---|---|
| 3,650,375 | 3/1972 | Fleischauer et al. | 198/790 |
| 3,840,110 | 10/1974 | Molt et al. | 198/781 |
| 4,196,312 | 4/1980 | DeGood et al. | 198/781 |
| 4,204,593 | 5/1980 | Leach | 198/781 |
| 4,238,029 | 12/1980 | Pirro, Jr. | 198/781 |
| 4,265,350 | 5/1981 | Vaughan | 192/67 P X |
| 4,278,166 | 7/1981 | Pirro, Jr. | 198/781 |
| 4,355,715 | 10/1982 | Choriton | 198/781 |
| 4,362,238 | 12/1982 | Rivette | 198/781 |
| 4,372,442 | 2/1983 | Fleischauer | 198/790 |
| 4,473,149 | 9/1984 | Vogt et al. | 198/781 |
| 4,488,639 | 12/1984 | Vogt et al. | 198/781 X |
| 4,504,094 | 3/1985 | Burrows | 192/67 P X |
| 4,572,358 | 2/1986 | Swain | 198/781 |

FOREIGN PATENT DOCUMENTS

| | | | |
|---|---|---|---|
| 2201599 | 7/1973 | Fed. Rep. of Germany | 192/67 P |
| 2806640 | 8/1978 | Fed. Rep. of Germany | 198/781 |

Primary Examiner—Robert J. Spar
Assistant Examiner—Lyle Kimms
Attorney, Agent, or Firm—Ian C. McLeod

[57] ABSTRACT

An improved chain drive (13 or 109) live roller (12 or 101) conveyor apparatus (10 or 100) with belts (21 or 110) which are easily replaced is described. The apparatus has a drive wheel (25 or 105) mounted around a shaft (27 or 107) projecting from a frame (11 or 116) adjacent to the sprocket which may be permanently or intermittently driven by the sprocket. Various apparatus are described for providing accumulation by disengaging the sprocket wheel from the drive wheel and thus stopping the rotation of the rollers. The apparatus are relatively simple and inexpensive to construct and provides quiet operation.

10 Claims, 9 Drawing Sheets

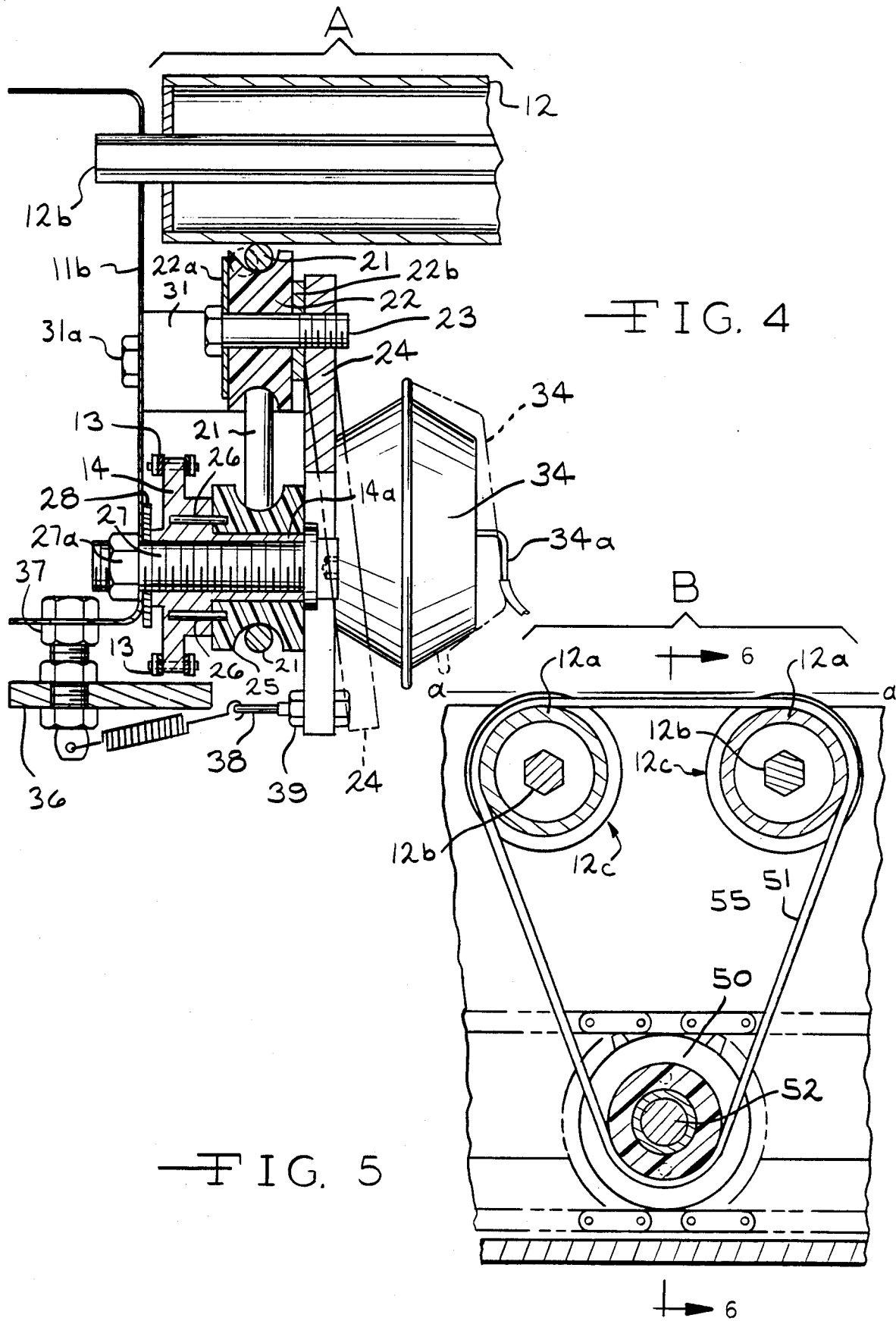

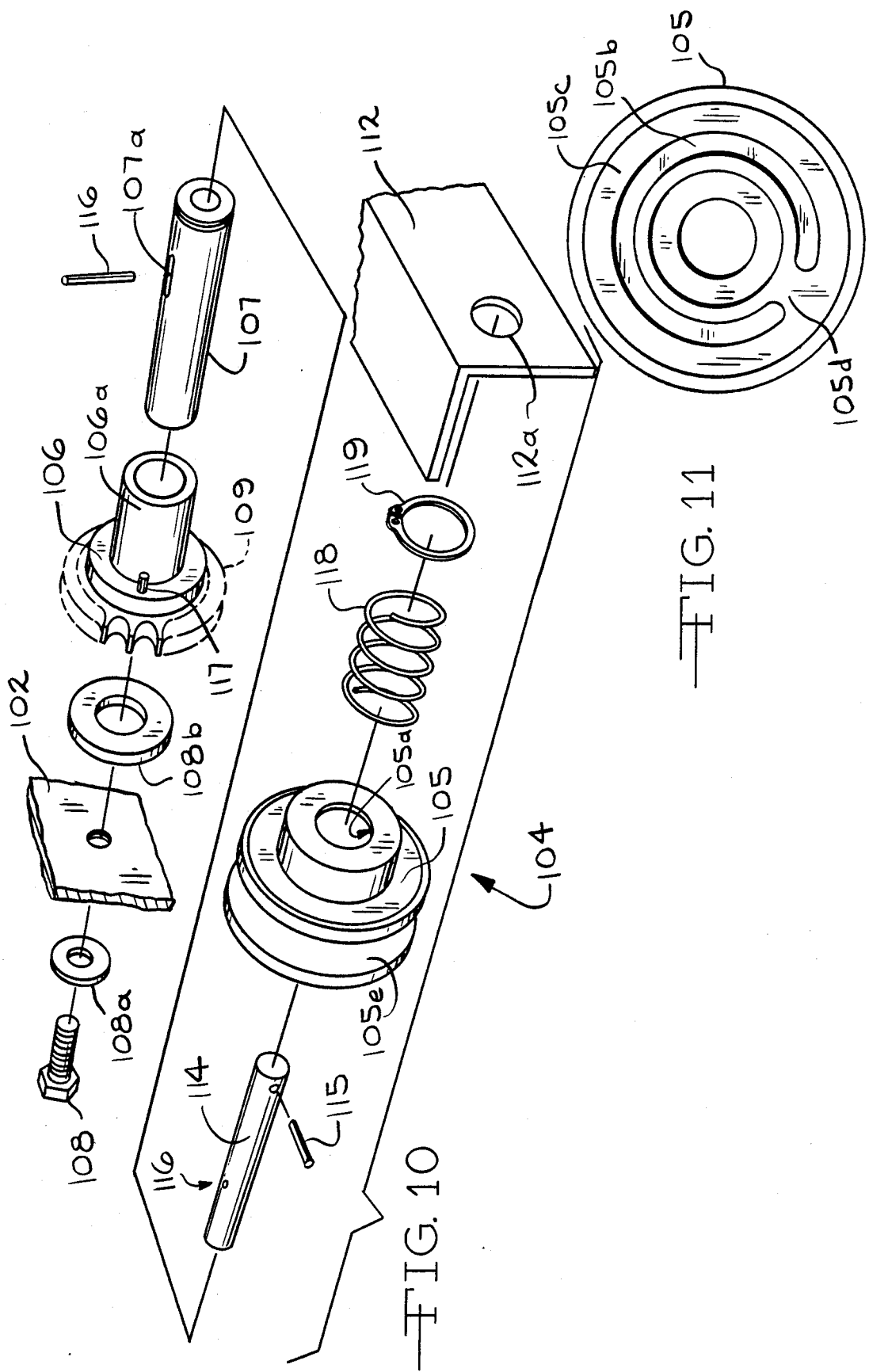

LIVE ROLLER CONVEYOR APPARATUS

BACKGROUND OF THE INVENTION

(1) Summary of the Invention

The present invention relates to a live roller conveyor apparatus which uses belts to drive the rollers. In particular the present invention relates to a conveyor apparatus with a chain driving a sprocket with a drive wheel for the belt wherein the belts can be easily removed from the drive wheel and replaced.

(2) Prior Art

The prior art has described various chain driven, live roller conveyor apparatus. Illustrative are U.S. Pat. Nos. 4,204,593 to Leach; 4,473,149 to Vogt et al; 4,488,639 to Vogt et al; and 4,572,358 to Swain. None of these conveyor apparatus include a belt for driving the rollers.

The belt driven, live roller conveyor apparatus are shown by U.S. Pat. Nos. 3,650,375 to Fleischauer et al, 3,840,110 to Molt et al; 4,196,312 to DeGood et al; 4,238,029 to Pirro; 4,278,166 to Pirro; 4,335,715 to Chorlton; 4,362,238 to Rivette; and 4,372,442 to Fleischauer. Each of these conveyor apparatus has a shaft which is mounted along the pass line to tension and drive the belts. In all but Fleischauer U.S. Pat. No. 4,372,442 the shaft must be removed to change the belts to provide a solid ring or a split belt must be welded together around the shaft. Split belts come apart much more readily than solid ring belts without a joint.

Fleischauer U.S. Pat. No. 4,372,442 attempts to solve the problem of belt replacement by providing an idler pulley for the belt. This construction has not been found to work well because the belts tend to come off the idler pulley. The problem is thus to be able to easily change the belts in the conveyor apparatus.

OBJECTS

It is therefore an object of the present invention to provide a live roller conveyor apparatus which has a drive wheel mounted adjacent to a chain driven sprocket so that the drive wheel has an open face thereby allowing the belts to be changed without disassembling the apparatus or using split belts. Further it is an object to provide an apparatus which is quiet during operation. Further still it is an object to provide an apparatus which is relatively simple and inexpensive to construct. These and other objects will become increasingly apparent by reference to the following description and the drawings.

IN THE DRAWINGS

FIG. 1 is a plan view of a preferred live roller apparatus 10 particularly illustrating a bar 24 which pivots on rods 29 to disengage driven wheels and belts 21 from a roller 12.

FIG. 2 is a front view along line 2—2 of FIG. 1 showing the driven wheels 22 mounted on the bar 24 and a chain 13 driving a sprocket 14.

FIG. 3 is a front view along line 3—3 of FIG. 1 showing a view opposite to FIG. 2.

FIG. 4 is a side cross-sectional view along line 4—4 of FIG. 3 particularly showing the movement of bar 24 which moves driven wheel 22 to disconnect belt 21 from the roller 12.

FIG. 5 is a front cross-sectional view along line 5—5 of FIG. 1 showing a single belt 51 engaging two rollers 12a.

FIG. 5A shows two belts 55 which replaces the single belt 51 of FIG. 5.

FIG. 6 is a side cross-sectional view showing a sprocket 50 connected to a drive wheel 53 by pins 54.

FIG. 7 is a plan view in partial section showing another embodiment of the apparatus of the present invention wherein a drive wheel 105 is pulled by means of a bar 112 as part of a release means to disengage from a sprocket 106.

FIG. 8 is a side cross-sectional view along line 8—8 of FIG. 7 showing the sprocket 106 and drive wheel 105 engaged.

FIG. 10 is a front perspective disassembled view of the release means 104.

Figure 1:
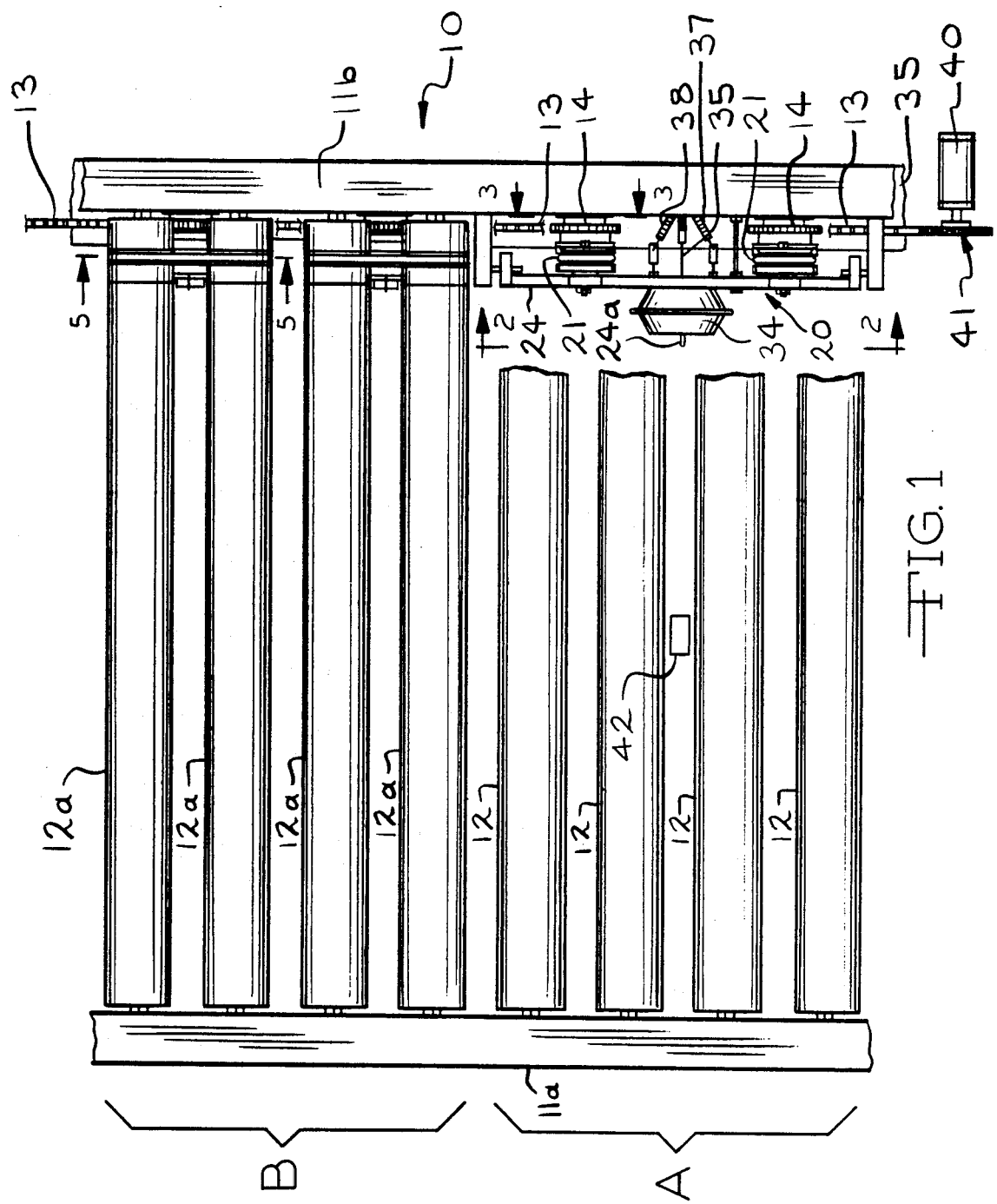

FIG. 11 is a front view of the drive wheel 105 showing a semi-circular groove 105b for pin 117 on sprocket 106.

GENERAL DESCRIPTION

The present invention relates to an improvement in a live roller conveyor apparatus including a frame and a plurality of rollers mounted on longitudinal axis at both ends on the frame in spaced relationship to each other so as to define a pass line on surfaces of the roller for transport of articles by the rollers, including multiple rotatable endless resilient belts mounted on or adjacent to the rollers so as to engage and drive the rollers and including drive means mounted on the frame for tensioning and driving the belts which comprises: drive wheels mounted on an axis of rotation on the frame so as to be in spaced relation to the rollers and to tension the belts for driving in a groove in the drive wheel; chain driven sprockets mounted adjacent to and on the axis of rotation of the drive wheels; and drive means including an endless chain mounted on the sprockets to drive the sprockets and thus the drive wheels and the belts.

The present invention also relates to an improvement in a live roller conveyor apparatus including a frame and a plurality of rollers mounted on longitudinal axis at both ends on the frame in spaced relation to each other so as to define a pass line on surfaces of the rollers for transport of articles by the rollers, including either (1) multiple driven wheels each with a circumferential rimmed groove mounted adjacent to the surfaces of the rollers with an endless resilient belt which fits into the groove of each driven wheel spaced from the driven wheels such that the belts and driven wheels are movable into or are in contact with the surfaces of at least one roller or (2) the belt without the driven wheels mounted around the surface of an in a groove in one or more of the rollers and including a drive means mounted on the frame for tensioning and driving the belts, which comprises: drive wheels mounted on an axis of rotation essentially parallel to the axis of the rollers and on the frame so as to be in spaced aligned relation to tension the belts for driving in grooves in the drive wheels; chain driven sprockets mounted adjacent to an on the axis of rotation of the drive wheels; drive means including an endless chain mounted on the sprockets to drive the sprockets and thus the drive wheels and the belts; and release means for stopping the rotation of the rollers by the belts while the sprockets are being driven by the chain.

In particular the present invention relates to a live roller conveyor apparatus which comprises: a frame a plurality of rollers mounted on longitudinal axes at both ends on the frame in spaced relation so as to define a pass line on surfaces of the rollers for transport of articles by the rollers; a support bar positioned on the frame adjacent the axes of multiple rollers, the support bar being arcuately pivotable towards and away from the axis of the rollers; multiple driven wheels each with a circumferential double rimmed groove rotatably mounted in spaced aligned relation on the support bar such that each driven wheel is adjacent the surface of at least one roller; an endless resilient belt which fits into the groove of each driven wheel such that a surface of each of the belts is movable into contact with the surface of at least one roller when the support bar is arcuately pivoted towards the axes of the rollers without slipping out of the groove; drive wheels mounted on an axis of rotation on the frame essentially parallel to the axis of the rollers so as to be in uniform spaced aligned relation to the driven wheels to tension the belts in a groove in the drive wheel; chain drive sprockets mounted adjacent to an one the axis of rotation of the drive wheels; drive means including an endless chain mounted on the sprockets to drive the sprockets and thus the drive wheels and belts; and an actuating means for moving the surfaces of the resilient belts on the driven wheels into and out of contact with the surfaces of the rollers by arcuately pivoting the support bar including a trigger means mounted on the pass line which activates a movable means on the frame which pivots the support bar.

Also the present invention relates to a live roller conveyor apparatus including a frame and a plurality of rollers mounted on longitudinal axis at both ends on the frame in spaced relation to each other so as to define a pass line on surfaces of the rollers for transport of articles by the rollers, including either (1) multiple driven wheels each with a circumferential rimmed groove mounted adjacent to the surfaces of the rollers with an endless resilient belt which fits into the groove of each driven wheel spaced from the driven wheels such that the belts and driven wheels are movable into or are in contact with the surfaces of at least one roller or (2) the belt without the driven wheels mounted around the surface of and in a groove in one or more of the rollers and including a drive means mounted on the frame for tensioning and driving the belts, the improvement in the drive means which comprises: drive wheels mounted on an axis of rotation essentially parallel to the axis of the rollers and on the frame so as to be in spaced aligned relation to tension the belts for driving in grooves in the drive wheels; chain driven sprockets mounted adjacent to and on the axis of rotation of the drive wheels; drive means including a chain mounted on the sprockets to drive the sprockets and thus the drive wheels and the belts; and release means for intermittently disconnectng the drive wheels from the sprocket.

SPECIFIC DESCRIPTION

FIGS. 1 to 6 show two preferred embodiments of the conveyor apparatus 10 and 49 of the present invention. The apparatus 10 includes conventional spaced apart frame rails 11a and 11b supporting conventional rollers 12 and 12a on spindles 12b. A chain 13 drives sprockets 14 and 50. Section A is constructed for accumulation. Section B is constructed for continuous drive and each Section A and B is described separately herein.

Figures 2, 3:
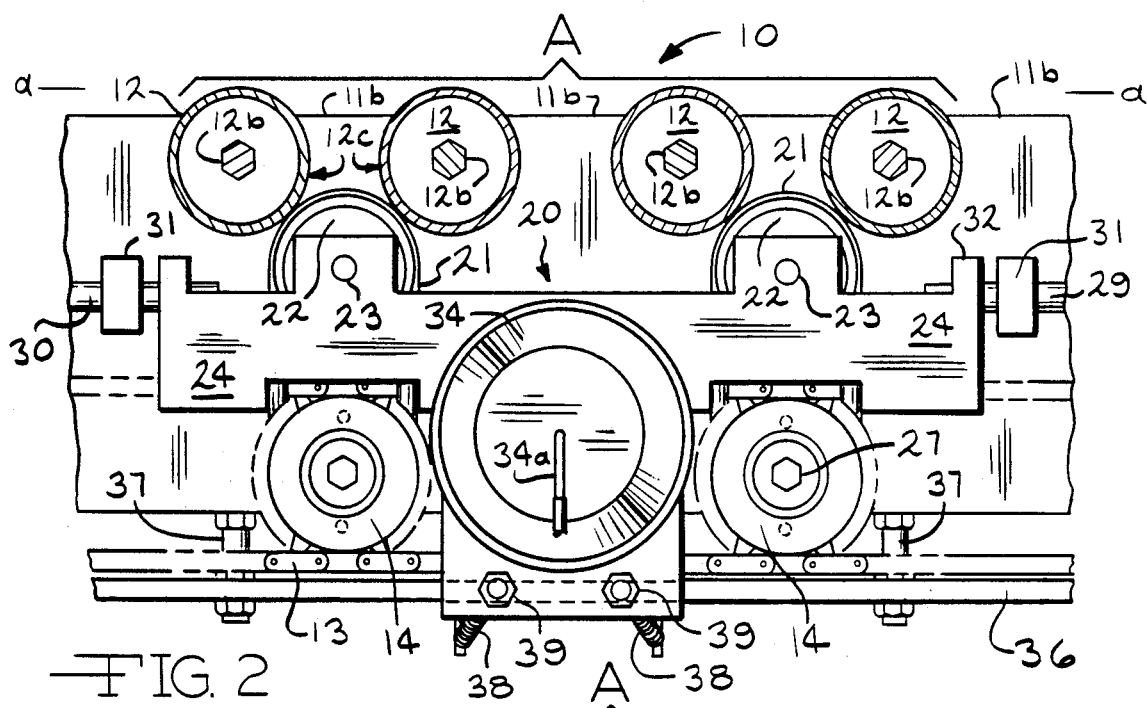

In section A, an accumulating live roller mechanism 20 is provided as particularly shown in FIGS. 2 to 4. The mechanism 20 includes belts 21 which are movable to the contact exterior surfaces 12c of two adjacent rollers 12. The belts 21 are each mounted around a driven pulley 22 mounted on shaft 23 secured to a movable bar 24 between washers 22a and 22b (FIG. 4). A drive pulley 25 is secured to sprocket 14 by means of pins 26 (FIG. 4) between the sprocket 14 and drive pulley 25. The drive pulley 25 is rotatable around shaft 27 on extension 14a from the sprocket 14 along with sprocket 14. The shaft 27 is secured to frame 11b by nut 27a. A spacing washer 28 is provided between the frame 11b and the sprocket 14. The bar 24 pivots on spaced apart rods 29 and 30 (FIG. 2) which are mounted on the frame 11b by means of brackets 31 and bolts 31a (FIG. 4). The bar 24 has integral ears 32 which clip onto rod 29. Thus pivoting of the bar 24 moves the belts 21 on driven pulleys 22 into and out of engagement with the surface 12c of the roller 12. The movable bar 24 is pivoted by means of an air bellows 34 mounted in bar 24. A push rod 35 extends from the bellows 34 so that when air is supplied to the inlet 34a the push rod 35 is extended to pivot the bar 24, as shown by the dotted lines in FIG. 4, thus disengaging the belt 21 from the roller 12. A slide bar 36 for chain 13 is secured to the frame 11b by means of a nut and bolt 37. Coil springs 38 are secured to the side rail 11b and to the movable bar 24 by means of bolt 39 which pivot the movable bar 24 into the position shown in FIG. 4 by the solid lines with the belt 21 engaging the roller 12. The chain 13 is driven by motor 40 with sprocket 41 as shown in FIG. 1.

Figure 5A:
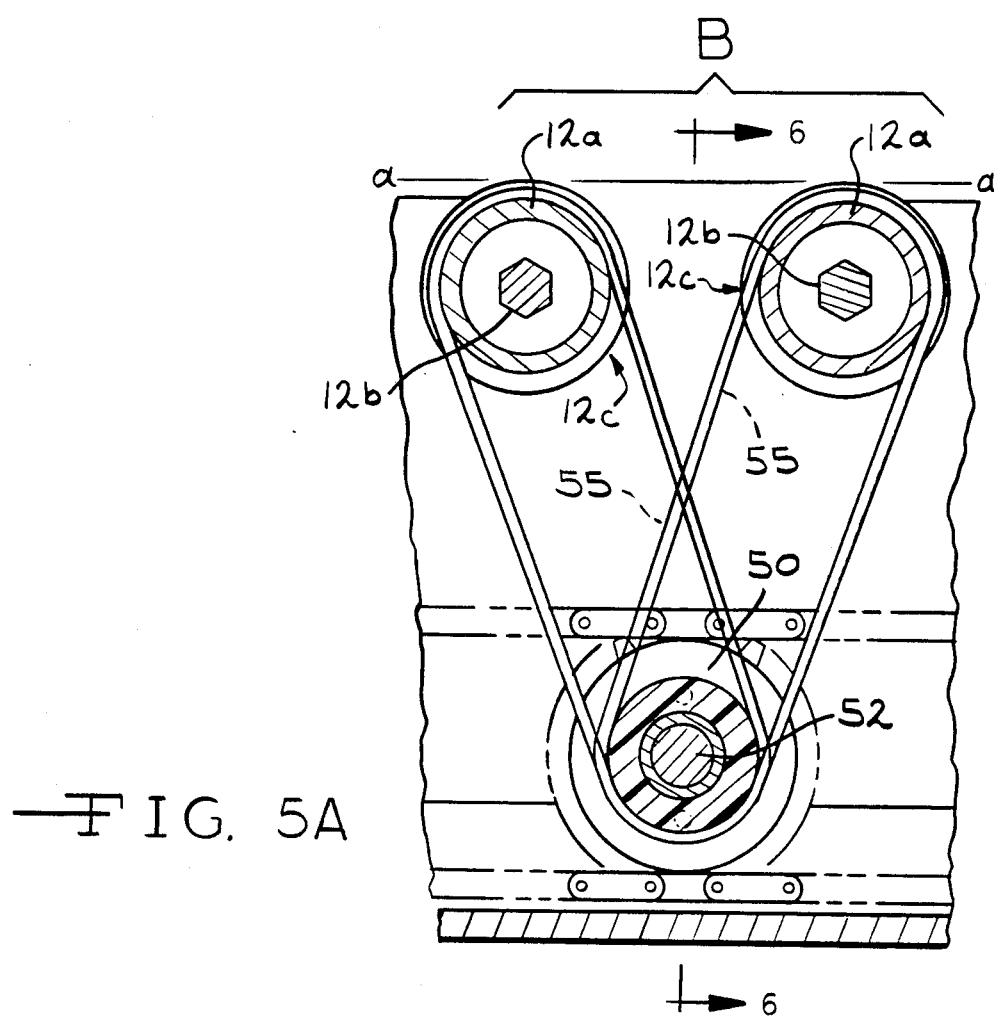
Figure 6:
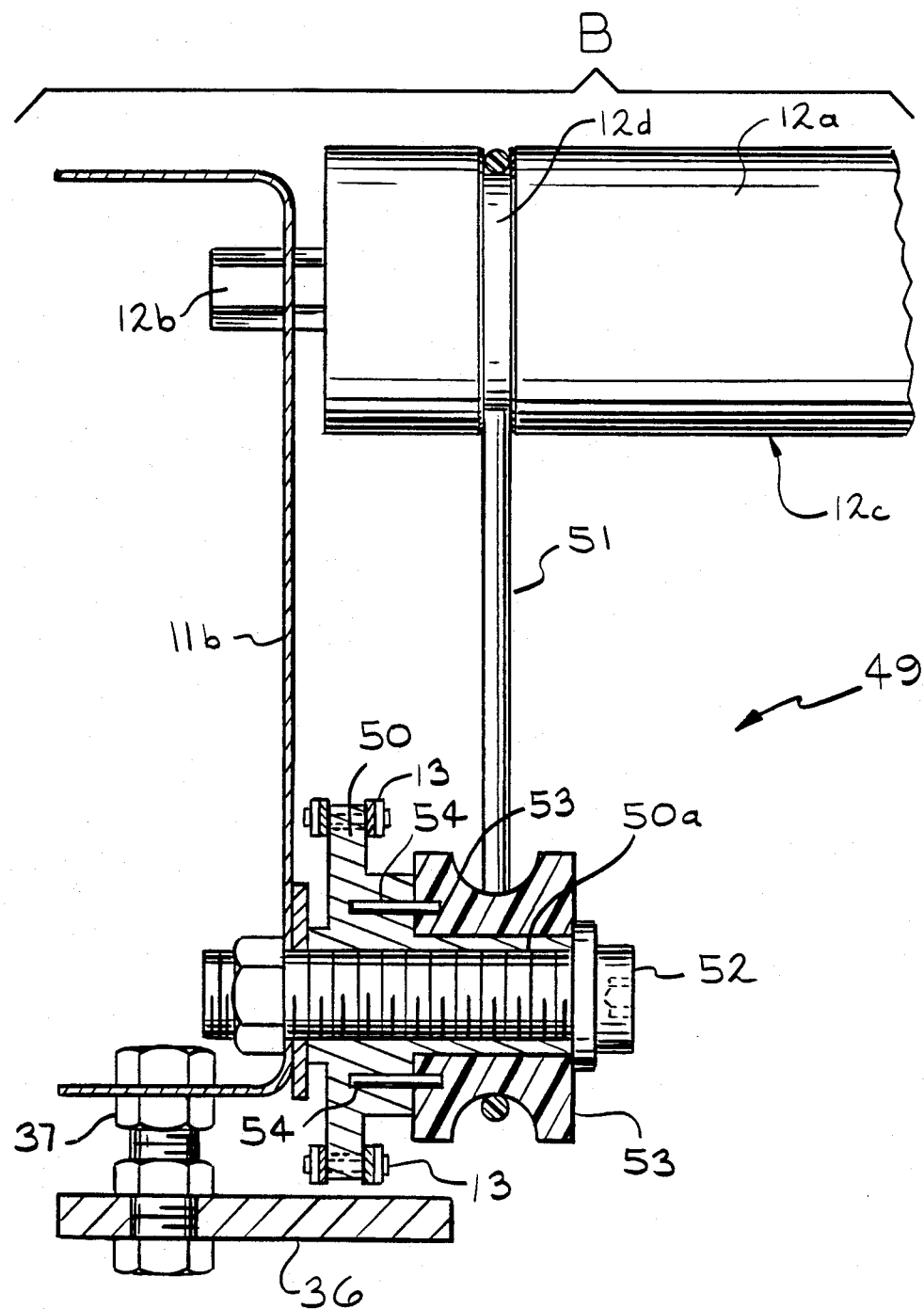

Section B is shown in detail in FIGS. 5 and 6. In this section, the belt 51 wraps around two adjacent rollers 12a in a groove 12d. The spindle 12b of roller 12a is mounted on frame rails 11a and 11b in the conventional manner. Chain 13 drives sprocket 50 which is supported on shaft 52. The sprocket has an extension 50a supporting drive pulley 53 which is held in place by pins 54. As is known in the art the pins 54 could be removed to provide a friction drive between the driving pulley 53 and extension 50a. The slide bar 36 for chain 13 held in place by bolt 36 and is provided to hold the chain on sprocket 50 in position. Thus the rollers 12a are continuously driven by the belts 51 in section B. It will be appreciated that each roller 12a could have a single belt shown by dotted lines 55 with the ends of two belts 55 over the driving pulley 53.

Thus in the apparatus 10 shown in FIGS. 1 to 6, section a provides accumulation by means of rollers 12 being disconnected from the belts 21 by pivoting movable bar 24 with push rod 35 as air is supplied to inlet 34a. When air is released, the belts 21 reengage the surface 12c of the roller 12. A trigger 42 (FIG. 1) on the passline a-a can be used to activate Section A. Section B provides continuous driving of the belts 51 (or 55) around the rollers 12a. Each Section A and B can have zones which are independently activated.

Figure 7:
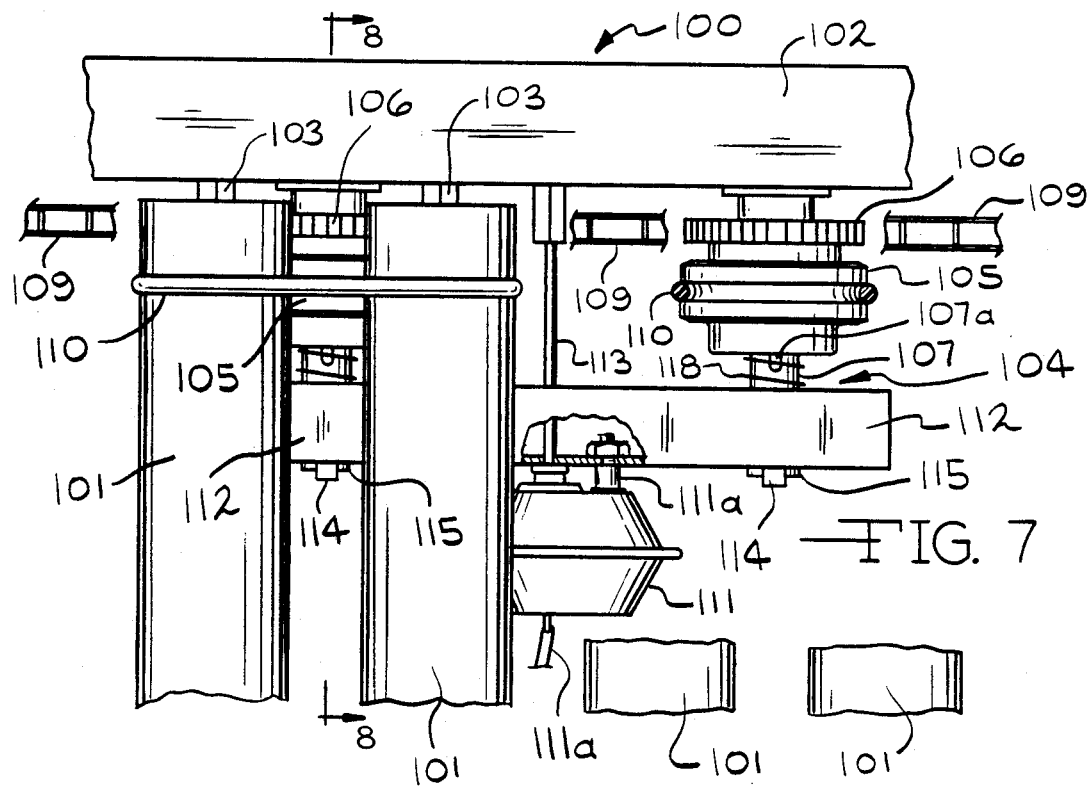
Figures 8, 9:
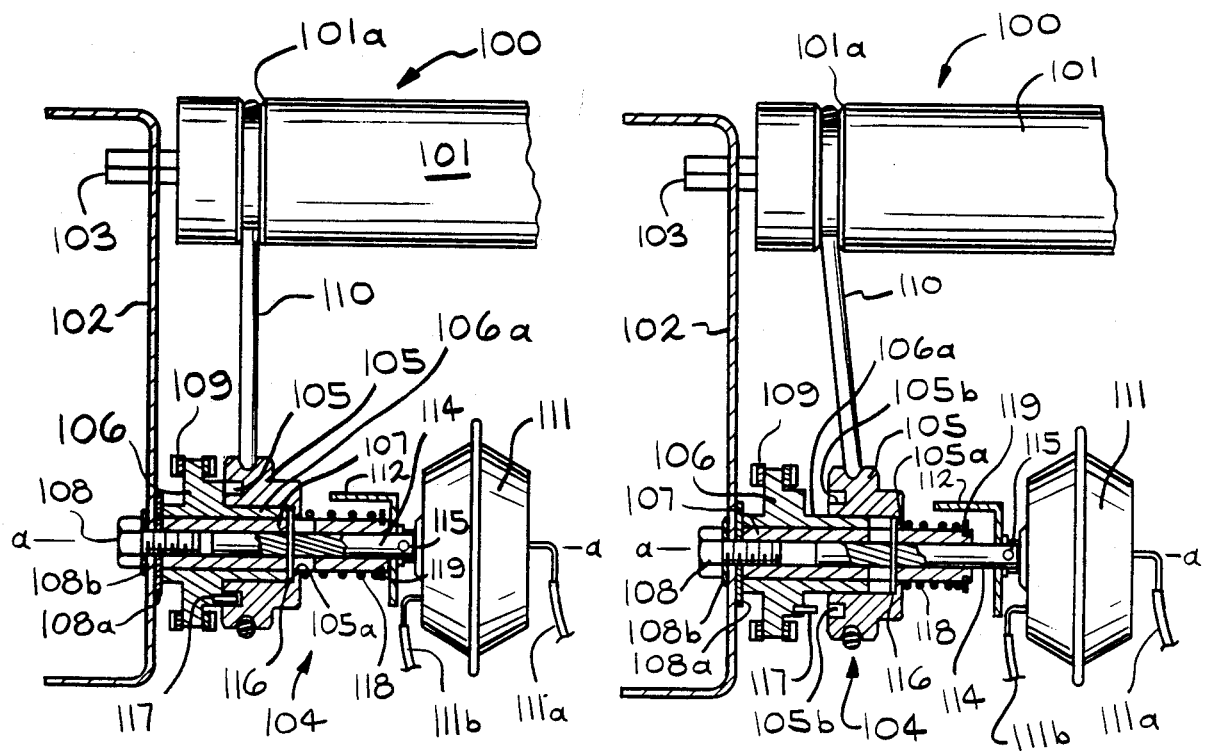
FIG. 9 is a side view as shown in FIG. 8 with the drive wheel 105 disengaged from the sprocket 106.

FIGS. 7 to 9 show another preferred apparatus 100 in partial section. Rollers 101 are mounted on frame member 102 (one shown) on shafts 103. A releasing mechanism 104 shown in separated detail in FIG. 10 provides for release of a drive wheel 105 mounted on an extension 106a of sprocket 106. The sprocket 106 is mounted on a shaft 107 secured to the frame 102 by a bolt 108. A spacing washer 108a is provided between the frame 102 and sprocket 106 and shaft 107. A lock washer 108b is provided on the bolt 108. A chain 109 drives the sprocket 106. A belt 110 is mounted around grooves 101a in rollers 101. A bellows 111 is mounted on bar 112 by means of extension 111a (FIG. 7) with a push rod 113 leading to the frame 102. The bellows 111 has an air inlet 111a and an air outlet 111b. The bar 112 is connected to pull rods 114 by means of pins 115 which engage the outside of the bar 112 through slots 112a in the bart 112. The pull rods 114 are slidable axially along axis a-a of the shaft 107. Pin 116 moves in slot 107a (FIG. 1) and engages a lip 105a (FIGS. 8 and 9) inside drive wheel 105 and pulls the drive wheel axially away from the sprocket 106. In this manner pin 117 is disengaged from the drive wheel 105 thus allowing the drive wheel 105 belt 110 and roller 101 to stop even though the sprocket 106 is being driven by the chain 109. A spring 118 urges the drive wheel 105 towards the sprocket 106 and is held in place on shaft 107 by a C retainer 119. As shown in FIG. 11 a semicircular groove 105b is provided on the face 105c of drive wheel 105 for engaging and disengaging the pin 117 on stop 105d. The drive wheel 105 has a circumferential groove 105e for belt 109.

As can be seen from FIG. 9, the bar 112 pulls the pull rod 114 inside of shaft 107 along axis a-a. The pin 116 pulls the drive wheel 105 away from the sprocket 106 to disengage the pin 117 from the groove 105b. The bellows 111 activates push rod 113 by means of air supply inlet 111a. When the air is released, spring 118 urges the pull rod 114 back into the position shown in FIG. 8. The semicircular groove 105b allows the pin to easily reengage the drive wheel 105 and to drive on stop 105d. The activating means 104 thus provides a rapid and easy transition into the accumulating cycle as shown in FIG. 9 and then back to the drive cycle shown in FIG. 8.

Thus as can be seen from FIGS. 1 and 11, the apparatus of the present invention in its various forms provides an effective means of driving a drive wheel using a chain and sprocket mounted on a common axis. The system is relatively inexpensive and efficient.

It is intended that the foregoing description be only illustrative of the present invention and that the invention be limited only by the hereinafter appended claims.

I claim:

1. In a live roller conveyor apparatus including a frame and a plurality of rollers mounted on longitudinal axes at both ends on the frame in spaced relationship to each other so as to define a pass line on surfaces of the roller for transport of articles by the rollers, including multiple rotatable endless resilient belts each separately mounted on one of the rollers or adjacent to at least one of the rollers so as to engage and drive the rollers and including drive means mounted on the frame for tensioning and driving the belts, the improvement in the drive means which comprises:
    (a) a drive wheel mounted on a shaft on an axis of rotation essentially parallel to the longitudinal axis of one of the rollers on the frame so as to be in spaced relation to one of the rollers and to tension one of the belts for driving in a groove in the drive wheel without twisting the belt;
    (b) a chain driven sprocket mounted in close relationship to the drive wheel and on the axis of rotation of the drive wheel and secured to the shaft so as to cause the drive wheel to rotate with the drive sprocket;
    (c) drive means including an endless chain mounted on the sprocket parallel to the pass line to drive the sprocket and thus the drive wheel and the belt; and
    (d) a release means for disengaging the drive means from the belt by disengaging the drive wheel from being driven by the sprocket.

2. In a live roller conveyor apparatus including a frame and a plurality of rollers mounted on longitudinal axes at both ends on the frame in spaced relation to each other so as to define a pass line on surfaces of the rollers for transport of articles by the rollers, including either (1) multiple driven wheels each with a circumferential rimmed groove mounted adjacent to the surfaces of the rollers with an endless resilient belt which fits into the groove of each driven wheel such that the belts are are in contact with the surface of at least one roller or (2) the belt without the driven wheels mounted around the surface of an in a groove in one or more of the rollers and including a drive means mounted on the frame for tensioning and driving the belts, the improvement in the drive means which comprises:
    (a) a drive wheel mounted on a shaft on an axis of rotation essentially parallel to the axis of one of the rollers and on the frame so as to be in spaced aligned relation to tension one of the belts for driving in a groove in the drive wheel without twisting the belt between the roller and drive wheel;
    (b) a chain driven sprocket mounted in contact with a drive wheel and on the axis of rotation of the drive wheel and secured to the shaft so as to cause the drive wheel to rotate with the drive sprocket.
    (c) drive means including a chain mounted on the sprockets to drive the sprocket parallel to the pass line and thus the drive wheel and the belt; and
    (d) a release means for disengaging the drive means from the drive wheel on the shaft while the drive means drive the sprocket and shaft, wherein the release means disengages the drive wheel from being driven by the sprocket.

3. The apparatus of claim 2 wherein the belt is in the groove around the roller.

4. The apparatus of claim 2 wherein the drive wheel can rotate around the shaft on the axis of rotation adjacent to the sprocket when disengaged and wherein a pin provided between the sprocket and drive wheel locks the sprocket and drive wheel together causes rotation of the belt when the drive wheel and sprocket are engaged.

5. The apparatus of claim 4 wherein the drive wheel moves along the shaft along the axis of rotation away from the sprocket to disengage the pin from the drive wheel or sprocket.

6. In a live roller conveyor apparatus including a frame and a plurality of rollers mounted on longitudinal axes at both ends on the frame in spaced relation to each other so as to define a pass line on surfaces of the rollers for transport of articles by the rollers, including either (1) multiple driven wheels each with a circumferential rimmed groove mounted adjacent to the surfaces of the rollers with an endless resilient belt which fits into the groove of each driven wheel such that the belts are are in contact with the surface of at least one roller or (2) the belt without the driven wheels mounted around the surface of an in a groove in one or more of the rollers and including a drive means mounted on the frame for tensioning and driving the belts, the improvement in the drive means which comprises:

(a) a drive wheel mounted on a shaft on an axis of rotation essentially parallel to the axis of one of the rollers and on the frame so as to be in spaced aligned relation to tension one of the belts for driving in a groove in the drive wheel without twisting the belt;

(b) a chain driven sprocket mounted in contact with the drive wheel and on the axis of rotation of the drive wheel and secured to the shaft so as to cause the drive wheel to rotate with the drive sprocket;

(c) drive means including an endless chain mounted on the sprocket to drive the sprocket parallel to the pass line and thus the drive wheel and the belt; and (d) release means for intermittently disconnecting the drive wheel from the sprocket by moving of the drive wheel away from the sprocket.

7. The apparatus of claim 6 wherein the release means is a bar connected to a pull rod slideably mounted adjacent to the shaft supporting the sprocket so as to pull the drive wheel away from the sprocket and to disconnect a pin from an opening in the sprocket or drive wheel and thus stop the drive wheel and belt.

8. The apparatus of claim 6 wherein a bellows activates a push or pull rod to move the drive wheel away from the sprocket to disconnect a pin on the sprocket or drive wheel from an opening in the sprocket or drive wheel and thus to stop the drive wheel and the belt.

9. The apparatus of claim 8 wherein a spring means mounted around th shaft engages the drive wheel to urge the drive wheel towards the sprocket when the bellows is deactivated.

10. The apparatus of claim 6 wherein a pin projects from the sprocket, wherein an opening is on a face of the drive wheel and wherein the opening is semicircular around the drive wheel to provide a stop for the pin when the drive wheel and sprocket are connected.

* * * * *

UNITED STATES PATENT AND TRADEMARK OFFICE
CERTIFICATE OF CORRECTION

PATENT NO. : 4,832,184
DATED : 1989 May 23
INVENTOR(S) : Randall K. DeGood

It is certified that error appears in the above—identified patent and that said Letters Patent is hereby corrected as shown below:

Face page, "9 Drawing Sheets" should be --7 Drawing Sheets--.

Column 1, line 23 "4,335,715" should be --4,355,715--.

Column 2, line 57 "an" should be --and--.

Column 2, line 65 "an" should be --and--.

Column 3, line 24 "drive" (second occurrence), should be --driven--.

Column 3, line 25 "an one" should be --and on--.

Column 4, line 52 "section a" should be --section A--.

Column 5, line 10 "bart" should be --bar--.

Column 5, line 38 "FIGS. 1 and 11" should be --FIGS. 1 to 11--.

Column 6, line 6, (Claim 1) "being driven by" should be deleted.

UNITED STATES PATENT AND TRADEMARK OFFICE
CERTIFICATE OF CORRECTION

PATENT NO. : 4,832,184
DATED : 1989 May 23
INVENTOR(S) : Randall K. DeGood

It is certified that error appears in the above—identified patent and that said Letters Patent is hereby corrected as shown below:

Column 6, line 15, (Claim 2) "are" (second occurrence) should be deleted.

Column 6, line 18 (Claim 2) "an" should be --and--.

Column 6, line 28 (Claim 2) "contact with a" should read --contact with the--.

Column 6, line 37 (Claim 2) "drive" should be --drives--.

Column 6, line 62 (Claim 6) "are" (second occurrence) should be deleted.

Column 6, line 65 (Claim 6) "an" should be --and--.

Column 8, line 10 (Claim 9) "th" should be --the--.

Signed and Sealed this

Eighth Day of May, 1990

*Attest:*

HARRY F. MANBECK, JR.

*Attesting Officer*   *Commissioner of Patents and Trademarks*